United States Patent
Ahn et al.

(10) Patent No.: US 6,573,155 B2
(45) Date of Patent: Jun. 3, 2003

(54) CONTACT STRUCTURE OF SUBSTRATES OF TOUCH PANEL AND METHOD OF BONDING THE SAME

(75) Inventors: Young-Soo Ahn, Seoul (KR); Young-Jin Oh, Kyungki-do (KR)

(73) Assignee: Atouch Co., LTD, Soul (KR)

( * ) Notice: Subject to any disclaimer, the term of this patent is extended or adjusted under 35 U.S.C. 154(b) by 0 days.

(21) Appl. No.: 10/103,095

(22) Filed: Mar. 21, 2002

(65) Prior Publication Data

US 2002/0098612 A1 Jul. 25, 2002

Related U.S. Application Data (62) Division of application No. 09/993,858, filed on Nov. 14, 2001.

(30) Foreign Application Priority Data

Jan. 10, 2001 (KR) .......................................... 2001-1245
Feb. 22, 2001 (KR) .......................................... 2001-8970

(51) Int. Cl.[7] ........................... H01L 21/30; H01L 21/46
(52) U.S. Cl. ..................... 438/455; 345/173; 178/18.05
(58) Field of Search ................... 438/51, 455; 345/173; 178/18.05

(56) References Cited

U.S. PATENT DOCUMENTS

| | | | | |
|---|---|---|---|---|
| 4,623,757 A | * | 11/1986 | Marino | 178/18.03 |
| 5,844,175 A | * | 12/1998 | Nakanishi et al. | 178/18.03 |
| 5,852,260 A | * | 12/1998 | Yoshikawa | 178/18.01 |
| 6,215,476 B1 | * | 4/2001 | Depew et al. | 345/173 |
| 6,310,614 B1 | * | 10/2001 | Maeda et al. | 345/173 |
| 6,356,259 B1 | * | 3/2002 | Maeda et al. | 345/173 |

* cited by examiner

*Primary Examiner*—John F. Niebling
*Assistant Examiner*—Angel Roman
(74) *Attorney, Agent, or Firm*—Brian S. Steinberger; Law Offices of Brian S. Steinberger, P.A.

(57) ABSTRACT

Process steps for bonding substrates of a touch panel. Steps include forming an insulator layer around a flexible printed cable (FPC) contact formed on electrodes, forming a low resistive metal layer, to which the FPC is attached, on the insulator layer, forming dot spacers out of insulating material within the active area. Next, connecting the FPC with a band region formed by the insulator layer and the low resistive metal layer after the insulator layer, the low resistive metal layer and the dot spacers have been formed. Finally, bonding the substrates for reading an X coordinate and for reading a Y coordinate after connection between the insulator layer, the low resistive metal layer, the dot spacers and the FPC.

4 Claims, 11 Drawing Sheets

CONTACT STRUCTURE OF SUBSTRATES OF TOUCH PANEL AND METHOD OF BONDING THE SAME

This is a Divisional of application Ser. No. 09/993,858 filed Nov. 14, 2001.

This invention claims the benefit of priority to Korean Patent Application No. 2001-1245 filed Jan. 10, 2001 and Korean Patent Application No. 2001/8970 filed Feb. 22, 2001. The present invention relates to a contact of substrates of a touch panel, and more particularly, to a method of bonding the substrates in order to embody optimal design thereof by reducing an inactive area on the touch panel and a contact structure of a flexible printed cable (FPC) for applying external signals to the touch panel.

BACKGROUND AND PRIOR ART

A personal computer, a portable transmitter, a personal digital assistant and the like perform text and graphic processing by using various input devices such as keyboard, mouse and digitizer.

In particular, the digitizer is a device for digitally detecting positions of the fingers or pens on a specifically manufactured flat panel and outputting their values in the form of X/Y coordinates. The digitizer has an advantage that it can input characters or figures more conveniently and precisely than the mouse, keyboard, scanner and the like. Among the digitizer, a touch panel has frequently been used for an electronic note or the personal digital assistant (PDA).

Figure 1:
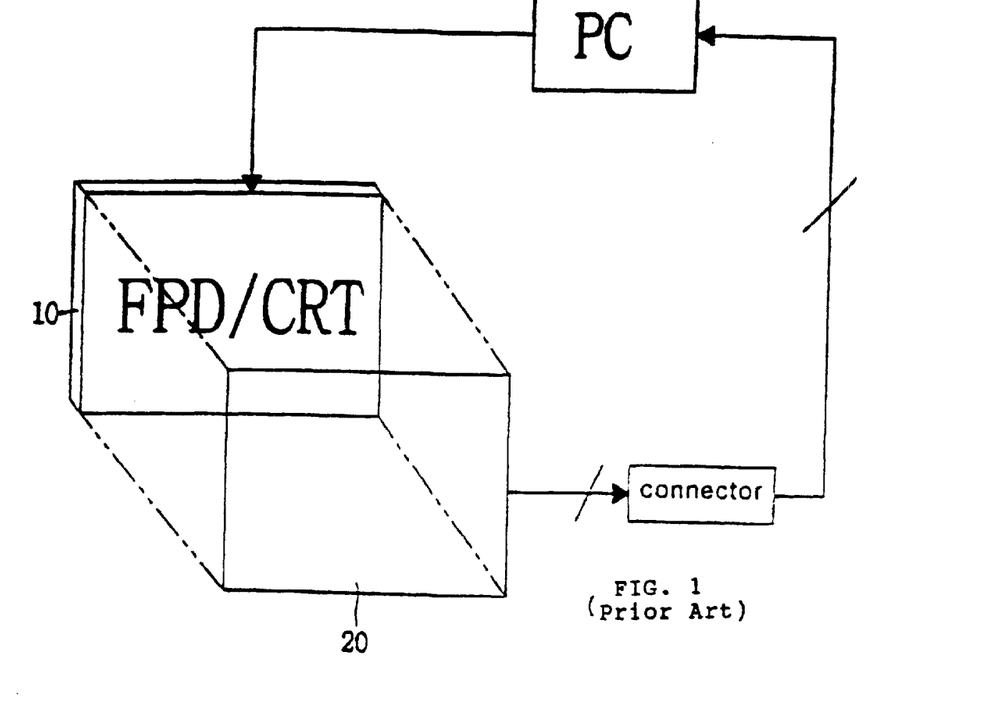
FIG. 1 is a view illustrating a drive circuit of the conventional touch panel.

As shown in FIG. 1, a digitizing apparatus, which can perform various functions of screen motions on a display 10 by attaching a touch panel 20 to a front surface of the display 10, is a typical type of a graphic user interface (GUI). The touch panel can be divided into a resistive type, a capacitive type, an ultrasonic wave type, an optical (infrared) type, an electromagnetic induction type and the like, according to operating methods thereof. Such various touch panels have features that signal amplification, resolution, difficulty in design and manufacturing techniques, and the like can be varied according to the operating methods thereof. The operating method of the touch panel can be selected according to its durability, its economical efficiency, etc. in addition to its optical property, its electromagnetic property, its mechanical property, its environmental resistance, its input property, etc.

The resistive touch panel has been combined with a liquid crystal display (LCD) and widely spread as an input device for use in the electronic note, the PDA, the portable personal computer, etc. Its design is very advantageous as compared with the other types of the touch panels, in view of thinness, compactness, lightness, low power consumption, etc. There are matrix and analog methods as a detection method of the resistive touch panel. Further, 0.1~0.2 mm thick film substrate, 0.2~2.0 mm thick glass substrate and 1.0~2.0 mm thick plastic substrate can be used as a transparent electrode, and upper/lower electrodes are constructed by combining these substrates. The analog detection method is again divided into 4-wire type, 5-wire type, 8-wire type, etc. according to electrode wiring.

Figure 2:
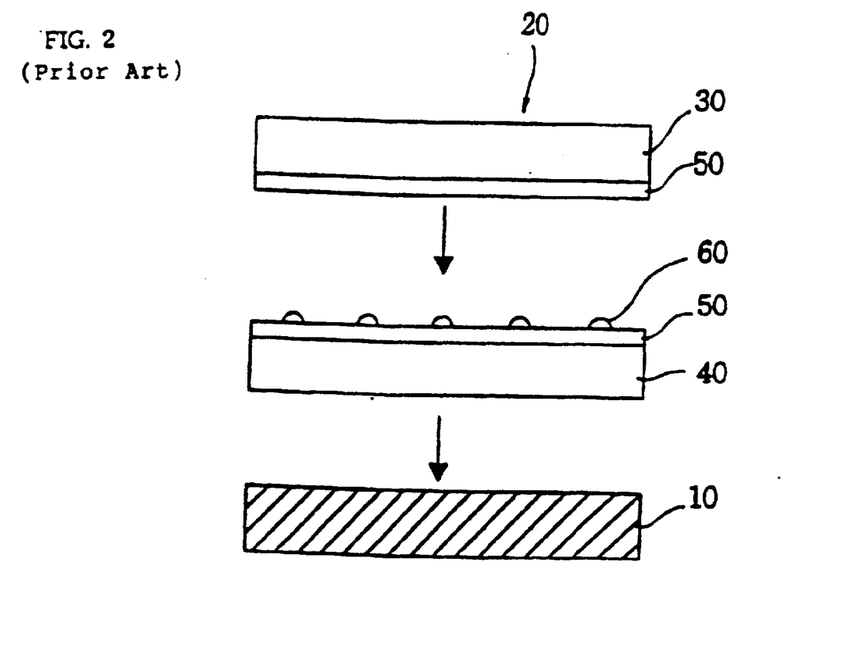
FIG. 2 is a schematic view of the conventional touch panel.

FIG. 2 is a schematic view of the resistive touch panel 20. The resistive touch panel is constructed by fabricating transparent conductive films 50 on a first substrate 30 for forming the upper electrode and a second substrate 40 for forming the lower electrode, respectively, and then by fabricating dot spacers 60 for electric insulation between the first and second substrates 30, 40 on the conductive film 50 of the second substrate 40. In the resistive touch panel, distribution of the signals on X/Y coordinates by means of the two substrates is calculated and is in turn sent to external driver soft through a connector. Further, the touch panel is divided into the 4-wire, 5-wire, 8-wire types according to the number of bus lines for recognizing the signals on the X/Y coordinates of the substrates. Consequently, characteristics of a recognition or signal processing method of the signals distributed on the X/Y coordinates can be varied according to the number of the bus lines.

Figure 3A:
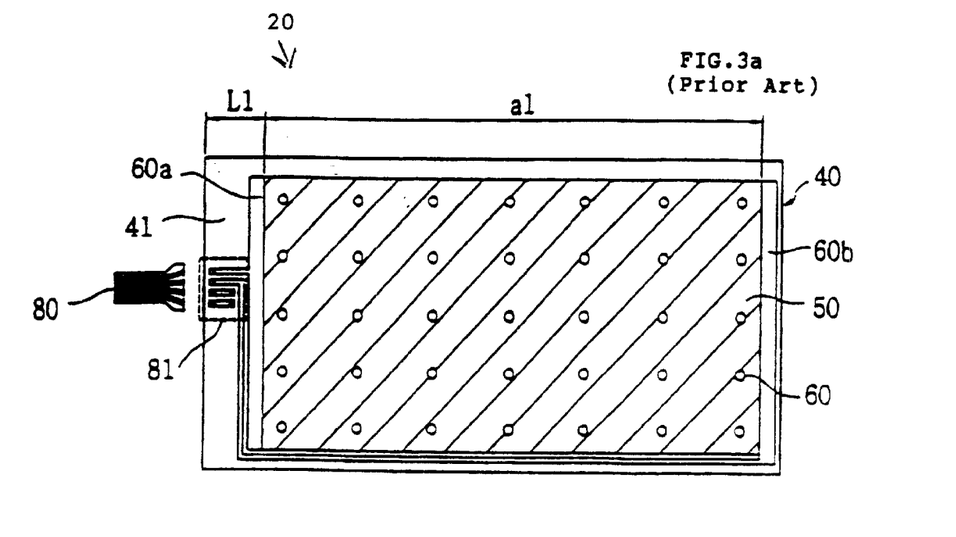
FIG. 3(a) is a plan view of a second substrate and FIG. 3(b) is a plan view of a first substrate.
Figure 3B:
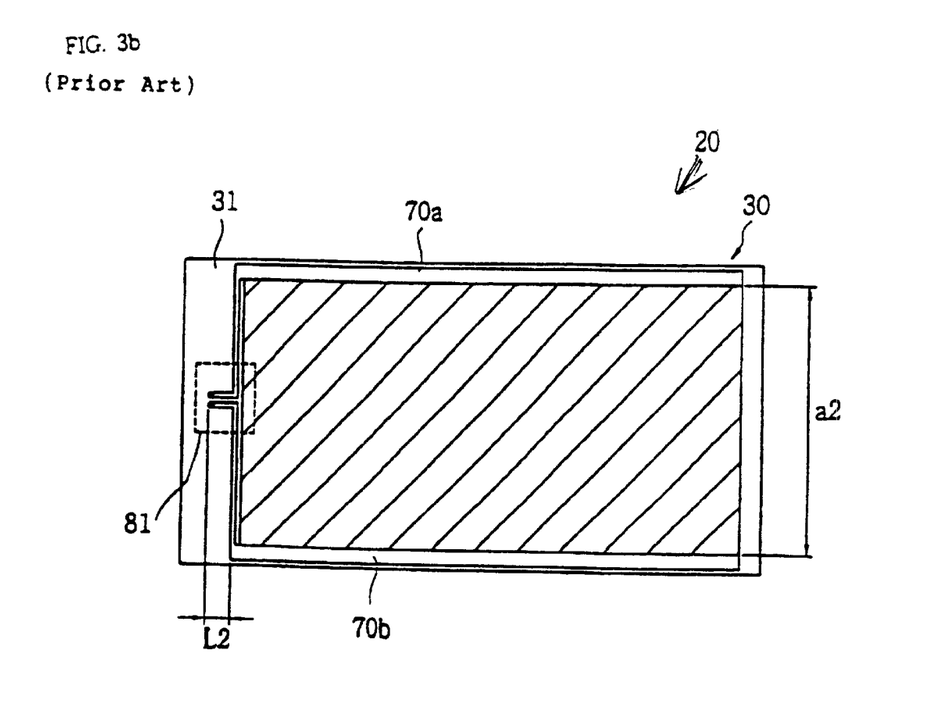

FIGS. 3 (a) and (b) show the 4-wire resistive touch panel 20, in which an insulating layer is processed and placed between the first substrate 30 and the second substrate 40.

As shown in FIG. 3 (a), in order to form an active area are made of high resistive metal, X-axis potential compensating electrodes 60a, 60b made of low resistive metal are arranged in two lines on both lateral sides of the transparent conductive film 50 of the second substrate 40, after the insulator layer has been formed on the substrate. Further, dot spacers 60 made of insulating material for electric insulation between the two substrates, i.e., the first substrate 30 and the second substrate 40, are formed within the active area al defined by a space between the potential compensating electrodes 60a, 60b.

As shown in FIG. 3 (b), in order to form an active area a2 made of high resistive metal, Y-axis potential compensating electrodes 70a, 70b made of low resistive metal are arranged in two lines on both lateral sides of the transparent conductive film 50 of the first substrate 30, after the insulator layer has been formed on the substrate.

Flexible printed cables (FPC) 80 for applying external signals to the touch panel 20 are connected to the first and second substrates 30, 40.

Before the first and second substrates 30, 40 are bonded together to FPC contacts 81 formed thereon, an electrical signal path made of conductive material is formed in order to apply the electric signals to the first substrate 30. After the FPCs 80 have been contacted to the FPC contacts 81 of both substrates, the second substrate 40 for sensing the X coordinate and the first substrate 30 for sensing the Y coordinate are bonded together in a state where the transparent conductive films 50 face each other. The X-axis and Y-axis potential compensating electrodes 60a, 60b; 70a, 70b, which are formed, respectively, on the first substrate 30 and the second substrate 40, are gathered on one side of the insulator layers 31, 41. Further, each of the first and second substrate 30, 40 has a predetermined FPC contact 81 for bringing the substrates into contact with the FPC 80.

The FPC contact 81 of the second substrate 40 comprises of a pattern that protrudes from the X-axis potential compensating electrode 60a by an arbitrary length (inactive area) L1; and another pattern that extends along an outer periphery of the active area al, is then bent, and further extends from the other X-axis potential compensating electrode 60b disposed parallel to the pattern. When the two substrates 30, 40 disposed parallel to each other are combined together by causing them to be disposed within the area having the arbitrary length L1 formed by the FPC contacts 81, it is constructed such that the other pattern, which abuts against the FPC contact 81 of the first substrate 30, is also disposed in parallel. Therefore, the patterns of the second substrate 40 have configurations that they protrude from the insulator layer 41 to the outside by an arbitrary length.

The contact 81 of the first substrate 30 has a configuration that patterns, which are gathered from each end of the Y-axis potential compensating electrodes 70a, 70b toward a central portion of the first substrate, protrude to the outside by an arbitrary length L2.

The contact points formed by respective FPC contacts 81 of the first substrate 30 and the second substrate 40 will be described according to the bonding process of the first substrate 30 and the second substrate 40. When the first substrate 30 is put over and combined with the second substrate 40, the pattern of the first substrate 30 comes exactly into contact with that of the second substrate 40. Thus, the first and second substrates 30, 40 can form the contact which the FPC 80 for applying the external signals via the FPC contact 81 gathered at one point can be contacted.

In order to detect the X coordinate in the aforementioned constitution, by applying a potential to the second substrate 40 through the FPC contact 81 disposed thereon, the potential is distributed on an entire surface of the transparent conductive film thereof. When the first substrate 30 has been in contact with the second substrate 40 by means of pressure exerted on a surface of the touch panel, the potential at that point is induced to the opposite first substrate 30. At this time, the signal is read into the FPC contact 81, and the X coordinate is then calculated. While the first substrate 30 is in contact with the second substrate 40 in this way, a potential for detecting the Y coordinate is also applied to the first substrate 30, and thus the potential is distributed on an entire surface of the transparent conductive film thereof.

Likewise, the Y-axis potential at a point where the pressure is applied is induced to the second substrate 40 and is received through the FPC contact 81. Then, the Y coordinate is calculated by using a signal corresponding to the received potential. Finally, the values obtained from the calculation of the X/Y coordinates are shown on the display.

In such a case of-the 4-wire resistive touch panel in which by using a single FPC 80, the potential is applied to the second substrate 40 through the FPC contact 81 and the X/Y coordinates are simultaneously recognized, the FPC contact 81 should be disposed on each of the two substrates. Thus, the inactive area, i.e., a pattern area (a minimal area for arranging the pattern) protruding to the outside by a length L1, must be expanded.

Furthermore, since the signals are applied through conductive material filled between the first and second substrates In the resistive touch panel, it is substantially likely that shock to the two substrates and dislocation thereof cause the contact patterns to be dislocated and result directly in inferiority of the contact. Therefore, there was a problem in that reliability of the products would be deteriorated.

SUMMARY OF THE INVENTION

An object of the present invention is to expand an active area between the two substrates, i.e., first and second substrates of a resistive touch panel.

Another object of the present invention is to reduce an inactive area, which is formed by (flexible printed cable) FPC contacts and signal contacts of the first and second substrates of the resistive touch panel, in order to reduce a compensating electrode area.

A further object of the present invention is to provide a substrate bonding method wherein an inactive area, which is formed by FPC contacts and signal contacts of first and second substrates of a resistive touch panel, can be reduced and positions of the FPC contacts on the touch panel can also be changed.

According to an aspect of the present invention for achieving the above objects, there is provided a contact structure for use in a touch panel including a first substrate having a transparent conductive film in which an active area is defined by symmetrically providing X-axis (Y-axis) potential compensating electrodes made of low resistive metal thereon at an arbitrary interval, a second substrate bonded together to the first substrate and having a transparent conductive film in which an active area is defined by symmetrically providing Y-axis (X-axis) potential compensating electrodes made of low resistive metal thereon at an arbitrary-interval, dot spacers filled between the two substrates so as to ensure electric isolation between the first and second substrates, and contacts concentrated on a flexible printed cable (FPC) so as to form an electrical signal path out of conductive material when the two substrates are bonded together. The contact structure comprises a FPC contact which is constructed at an arbitrarily selected point on electrode arrangement defined by the X-axis (Y-axis) potential compensating electrodes arranged on the transparent conductive film of the first substrate along outermost edge portions thereof; and another FPC contact which is bonded to the FPC contact on the first substrate and is constructed at an arbitrarily selected point on another electrode arrangement defined by the Y-axis Q(-axis) potential compensating electrodes arranged on the transparent conductive film of the second substrate along outermost edge portions thereof.

According to another aspect of the present invention, there is also provided a contact structure for use in a touch panel including a first substrate having a transparent conductive film in which an active area is defined by symmetrically providing X-axis (Y-axis) potential compensating electrodes made of low resistive metal thereon at an arbitrary interval, a second substrate bonded together to the first substrate and having a transparent conductive film in which an active area is defined by symmetrically providing Y-axis (X-axis) potential compensating electrodes made of low resistive metal thereon at an arbitrary interval, dot spacers filled between the two substrates so as to ensure electric isolation between the first and second substrates, and contacts concentrated on a flexible printed cable (FPC) so as to form an electrical signal path out of conductive material when the two substrates are bonded together. The contact structure comprises X-axis (Y-axis) potential compensating electrodes arranged along outermost edge portions of the transparent conductive film of the first substrate; a FPC contact for the first substrate, which is constructed at an arbitrarily selected point on electrode arrangement defined by the X-axis (Y-axis) potential compensating electrodes arranged on the transparent conductive film of the first substrate; Y-axis (X-axis) potential compensating electrodes IS arranged along outermost edge portions of the transparent conductive film of the second substrate; another FPC contact for the second substrate, which is constructed at an arbitrarily selected point on electrode arrangement defined by the Y-axis (X-axis) potential compensating electrodes arranged on the transparent conductive film of the second substrate; an insulator layer having an arbitrary length which is formed along the X-axis and Y-axis potential compensating electrodes around the FPC contacts constructed, respectively, on the potential compensating electrodes of the first and second substrates; and a low resistive metal layer in which the FPC is attached to an upper layer portion of the insulator layer formed on the potential compensating electrodes.

According to a further aspect of the present invention, there is also provided a contact structure for use in a touch panel including a first substrate having a transparent conductive film in which an active area is defined by symmetrically providing X-axis (Y-axis) potential compensating electrodes made of low resistive metal thereon at an arbitrary interval, a second substrate bonded together to the first substrate and having a transparent conductive film in which an active area is defined by symmetrically providing Y-axis (X-axis) potential compensating electrodes made of low resistive metal thereon at an arbitrary interval, dot spacers filled between the two substrates so as to ensure electric isolation between the first and second substrates, and contacts concentrated on a flexible printed cable (FPC) so as to form an electrical signal path out of conductive material when the two substrates are bonded together. The contact structure comprises an insulator layer having an arbitrary length which is formed along the X-axis and Y-axis potential compensating electrodes around the FPC contacts constructed, respectively, on the potential compensating electrodes of the first and second substrates; and a low resistive metal layer in which the FPC is attached to an upper layer portion of the insulator layer formed on the potential compensating electrodes.

According to a still further aspect of the present invention, there is a method for bonding substrates of a touch panel fabricated by processes of forming insulator layers on first and second substrates, forming potential compensating electrodes out of low resistive metal on transparent conductive films, forming dot spacers out of insulating material within an active area so as to achieve electric insulation between the first and second substrates, connecting a flexible printed cable (FPC) to the first and second substrates so as to apply signals to the touch panel from the outside, and bonding the first substrate for detecting an X coordinate and the second substrate for detecting a Y coordinate together so that the transparent conductive films can face each other. The method for bonding the substrates of the touch panel comprises the steps of forming the potential compensating electrodes out of the low resistive metal on the transparent conductive films upon completion of a process of depositing an insulator layer onto the first and second substrates, and forming an insulator layer around flexible printed cable (FPC) contacts formed on the potential compensating electrodes of arbitrarily selected one of the first and second substrates so as to arbitrarily change positions of the FPC contacts with respect to the potential compensating electrodes; forming a new low resistive metal layer, to which FPCs will be attached, on the insulator layer so as to connect the FPC to the potential compensating electrodes of the substrates; forming dot spacers out of insulating material within the active area so as to achieve electric insulation between the first and second substrates between which the insulator layer and the low resistive metal layer are formed through the above steps; connecting the FPC with a band region formed by the insulator layer and the low resistive metal layer, in order to apply signals to the first and second substrates from the outside after the insulator layer, the low resistive metal layer and the dot spacers have been formed between the first and second substrates through the above steps; and bonding together the first substrate for reading an X coordinate and the second substrate for reading a Y coordinate so that the transparent conductive films can face each other, after the connection between the insulator layer, the low resistive metal layer, the dot spacers and the FPC, which are sequentially formed through the steps, has been completed.

In a case where the substrate contact of the resistive touch panel is constructed as such, the signal contacts are formed in the two substrates for constructing the upper and lower electrodes. Thus, the inactive area is remarkably reduced while the active area is increased. From the viewpoint of the constitution of the touch panel, dislocation of a contact band can be greatly reduced, and contact stability that contact deformation due to the external shock is hardly produced can be obtained. Further, since the FPC contacts are fabricated according to the bonding method of the present invention, optimum design of the touch panel including the arrangement of the potential compensating electrodes for expansion of the active area can be realized and a degree of freedom of the FPC contact positions for the external signal application can be kept large.

Further objects and advantages of this invention will be apparent from the following detailed description of presently preferred embodiments which are illustrated schematically in the accompanying drawings.

BRIEF DESCRIPTION OF THE DRAWINGS

FIG. 3(a) and FIG. 3(b) shows the touch panel of FIG. 2, wherein

FIG. 5(a) and FIG. 5(b) shows a surface of substrates of FIG. 4, wherein

FIGS. 6 (a) and 6(b) are views illustrating examples of a process of fabricating the touch panel according to the present invention.

FIGS. 7 (a), 7(b) and 7(c) are views illustrating other examples of a process of fabricating the touch panel according to the present invention.

DETAILED DESCRIPTION OF THE INVENTION

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 4:
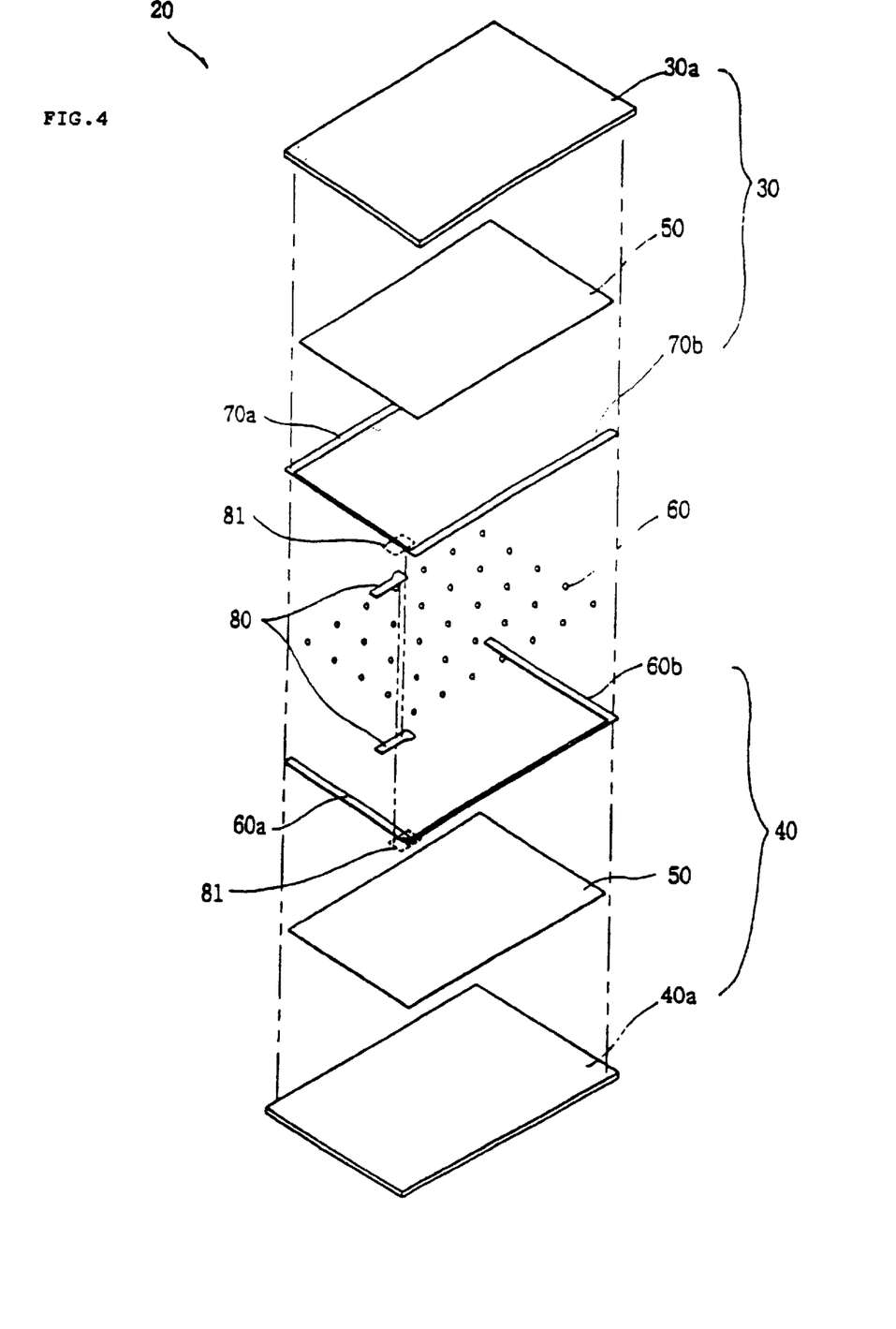
FIG. 4 is an exploded perspective view illustrating a touch panel according to the present invention.
Figure 5A:
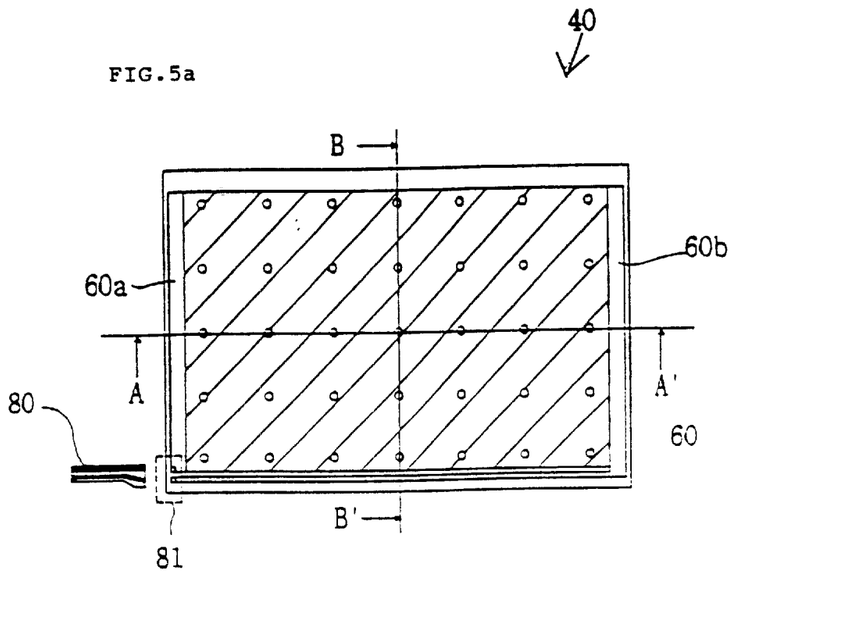
FIG. 5(a) is a plan view of a second substrate and FIG. 5(b) is a plan view of a first substrate.
Figure 5B:
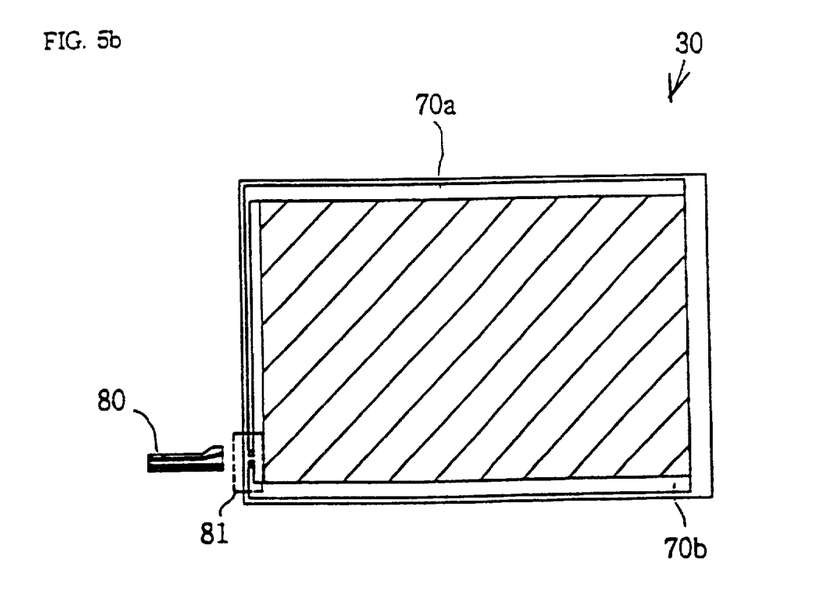

As shown in FIGS. 4 and 5, a substrate contact according to the present invention is constructed in such a manner that potential compensating electrodes 60a, 60b, 70a; 70b made of low resistive metal are formed on transparent conductive films (high resistive metal) 50 after a process of forming insulator layers of first and second substrates 30, 40 (process of depositing the insulator layers or process of etching the transparent conductive film); that dot spacers 60 made of insulating material are formed within an active area for electric insulation between the two substrates; that flexible printed cables (FPCs) 80 are connected to the first and second substrates 30, 40, respectively, in order to apply signals to the touch panel (screen) from the outside; that the first substrate 30 for detecting X coordinate is bonded together with the second substrate 40 for detecting Y coordinate so that the transparent conductive films 50 are interposed between and face them; and that the FPCs 80 are finally concentrated at one point.

Further, the X-axis (Y-axis) potential compensating electrodes 70a, 70b are arranged along outermost edge portions of the transparent conductive film 50 of the first substrate 30; an arbitrary point within electrode arrangement, which is made by X-axis (Y-axis) potential compensating electrodes 70a, 70b arranged on the transparent conductive film 50 of the first substrate 30, is selected; and a FPC contact 81 is constructed at the point. The Y-axis (X-axis) potential compensating electrodes 60a, 60b are arranged along outermost edge portions of the transparent conductive film 50 of the second substrate 40; an arbitrary point within electrode arrangement, which is made by Y-axis (X-axis) potential compensating electrodes 60a, 60b arranged on the transparent conductive film 50 of the second substrate 40, is selected; and another FPC contact 81, which will be connected to the FPC contact 81 on the first substrate 30, is constructed at the point.

In other words, an arbitrary one of the four corner portions which are defined by the Y-axis (X-axis) potential compensating electrodes 60a, 60b arranged onto the transparent conductive film 50 of the second substrate 40 along the outermost edge portions of the transparent conductive film 50 is selected, and the FPC contact 81 for the second substrate 40 is constructed at the selected corner and directly connected to the FPC 80. Further, an arbitrary one of the four corner portions which are defined by the X-axis (Y-axis) potential compensating electrodes 70a, 70b arranged onto the transparent conductive film 50 of the first substrate 30 along the outermost edge portions of the transparent conductive film 50 is selected, and the FPC contact 81 for the first substrate 30 is constructed at the selected corner and directly connected to the FPC 80. That is, the connection position of the FPC 80 is determined as the arbitrary one of the four corner portions of the substrate. Here, the X-axis potential compensating electrodes 60a, 60b are symmetrically arranged on the substrate 40a of the second substrate 40.

According to the aforementioned basic constitution of the touch panel, if the potential is applied to the first substrate 30 in order to detect the X coordinate, it is distributed on an entire surface of the transparent conductive film. Then, when the upper and lower substrates (the first and second substrates) are brought into contact with each other by applying pressure onto the touch panel (screen) using the fingers or pens, the potential at a point where the pressure is applied is induced to the second substrate 40 and the X coordinate is calculated by using a signal resulting from the induced potential. Further, the potential for detecting the Y coordinate is also applied to the second substrate 40 and is then distributed on the entire surface of the transparent conductive film, while the upper and lower substrates (the first and second substrates) are in contact with each other. The Y-axis potential at the point where the fingers or pens have contacted is also induced to the first substrate 30, and the Y coordinate is also calculated by using a signal resulting from the induced potential. Finally, values of the X/Y coordinates calculated above are shown on the display.

Therefore, the calculating method and operation of the present invention is considered to be identical to those of the conventional touch panel. However, the FPC contact 81 for the second substrate 40 is constructed by arranging the X-axis (Y-axis) potential compensating electrodes 60a, 60b along the outermost edge portions of the transparent conductive film of the second substrate 40 and selecting the arbitrary one of the four corner portions defined by the X-axis (Y-axis) potential compensating electrodes 60a, 60b on the transparent conductive film of the second substrate 40, as shown in FIG. 5 (*a*); and the FPC contact 81 is constructed on the first substrate 30 by arranging the Y-axis (X-axis) potential compensating electrodes 70a, 70b along the outermost edge portions of the transparent conductive film of the first substrate 30 and selecting the arbitrary one of the four corner portions defined by the Y-axis (X-axis) potential compensating electrodes 70a, 70b on the transparent conductive film of the first substrate 30, as shown in FIG. 5 (*b*). Accordingly, the present invention has structural characteristics that an optimal design such as expansion of the active area due to reduction of the inactive area and product compactness due to reduction of the compensating electrode area can be realized and that problems of product reliability deterioration such as poor contact due to dislocation between and shock to the two substrates can be solved.

In a case where the contact of the touch panel is constructed at the corner portions of the two substrates without forming the inactive area as shown in FIGS. 4 and 5, the signal contacts should be installed on the two substrates. Thus, the active area is increased, whereas the inactive area is greatly reduced. Further, from the structural viewpoint thereof, dislocation of a contact band is greatly reduced and contact stability, which does not produce contact deformation with respect to the shock, is obtained. Here, as compared with the prior art, an increasing amount of the active area is proportional to a decreasing amount of the inactive area needed for the patterns.

Furthermore, a-phenomenon such as the dislocation of the contact band resulting from the pattern contact is not produced since the FPC contacts 81 which are in direct contact with the FPC 80 are the two substrates, respectively. Although the shock is applied to the contacts, changes in the pattern contact are not produced since the contacts are not contacted with the pattern contact but they are directly contacted with the FPC 80.

Figure 6A:
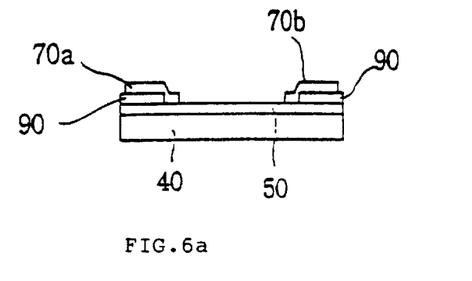
Figure 6B:
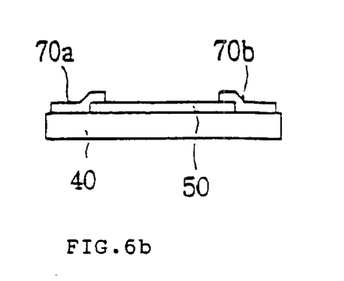
Figure 7A:
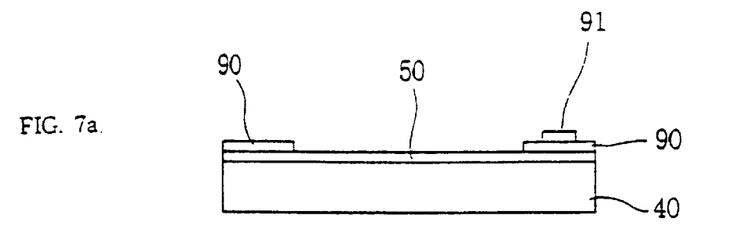
Figure 7B:
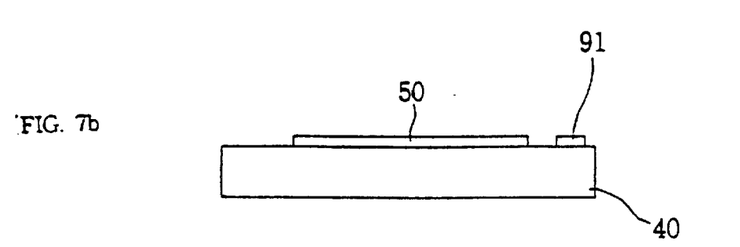
Figure 7C:
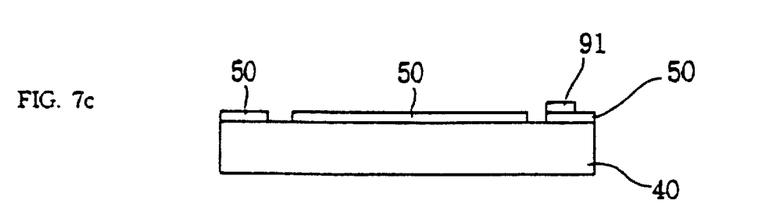

FIGS. 6 and 7 show examples of a method for fabricating the touch panel.

FIGS. 6 (*a*) and 6(*b*) are sectional views taken along line A–A' of FIG. 5, wherein (*a*) shows an example in which an insulator layer 90 is formed on the transparent conductive film 50, and (*b*) shows another example in which the X-axis potential compensating electrodes 70a, 70b are formed on the transparent conductive film 50 through a process of depositing low resistive metal after the transparent conductive film 50 has been removed by an etching process.

FIGS. 7 (*a*), 7(*b*) and 7(*c*) are sectional views taken along line B–B' of FIG. 5, wherein FIG. 7(*a*) shows an example in which the insulator layer 90 is formed on the transparent conductive film 50, FIG. 7(*b*) shows another example in which the process of depositing a low resistive wiring 91 made of the low resistive metal has been performed on the transparent conductive film 50 after the transparent conductive film 50 has been removed by the etching process, and FIG. 7(*c*) shows a further example in which the transparent conductive film 50 is partly removed by the etching process and thus insulation between the low resistive wiring 91 and the transparent conductive film 50 within the active area is maintained and which may be employed in a laser etching process and the like.

In the substrate contact structure of the present invention, the conventional signal contact, which has been necessarily required for electrical signal exchange between the first and second substrates 30, 40, was removed. Instead, it is possible to make the electrical signal exchange through the FPC in the same manner as before without any problems resulting from the removal of the signal contact. According to the prior art, the second substrate was formed with both the FPC contact and the signal contact, and the first substrate was formed with only the signal contact. On the contrary, according to the present invention, the low resistive metal is arranged to the outside, and simultaneously only the FPC contact is fabricated on the first and second substrates without the signal contact. Thus, the active area can be expanded, the dislocation of the contact band can be well prepared, and contact stability can be greatly improved.

Therefore, the inactive area can be reduced on the touch panel, and the active area can be increased thereon. Further, the entire size of the touch panel can be reduced as much as the active area is increased, while the touch area same as the conventional touch panel is still maintained. Accordingly, the expansion of the active area can be of help to the design of the compact touch panel.

For reference, it should be understood that in the wiring design of the FPC contact, if the wiring pattern has been separated through the contact for separating the patterns so as not to be combined with each other and gathering them into one position, the contact protrudes toward the FPC and an area corresponding to the length of the protruding pattern becomes the inactive area. Consequently, the active area is reduced as much as the inactive area is increased.

According to the substrate contact structure of the basic touch panel of the present invention, in a case where the FPCs for applying signals to the touch panel are connected to the substrates, the connection can be made at only the corner portion thereof (like a type in which positions of the FPCs are concentrated on one place so that modular work can be conveniently performed when the FPC is to be connected to a connector of an external system, i.e., a case where connecting position of the FPC is determined as the arbitrary one of the four corner portions of the substrates, etc.). Thus, although there are advantages in that expansion of the active area, optimal design such as the product compactness due to reduction of the compensating electrode area, and structural solution of the problems of deterioration of the product reliability such as inferiority of the contact resulting from the shock can be obtained from the present invention, any methods of changing or adjusting the connection positions of the FPCs or specific design techniques are not proposed in the present invention. In general, there are needs for changing or adjusting the connection positions of the FPCs on the touch panel in fabricating processes like when the connecting positions of the FPCs are corrected in accordance with relationship between the positions of the FPCs of the touch panel and the position of the connector of the external system, and when the specification of the FPCs is changed in accordance with package characteristics, or the like.

Accordingly, in addition to the basic constitution of the substrate contact, a novel bonding method for variously changing the connecting positions of the FPCs can be included in the present invention.

The touch panel bonding method for bonding substrates of the touch panel, which has been employed in the conventional touch panel (refer to FIGS. 1 to 3), comprises the steps of forming insulator layers on first and second substrates, forming potential compensating electrodes out of low resistive metal on transparent conductive films, forming dot spacers out of insulating material within an active area so as to achieve electric insulation between the first and second substrates, connecting flexible printed cables (FPCs) to the first and second substrates so as to apply signals to the touch panel from the outside, and bonding the first substrate for detecting an X coordinate and the second substrate for detecting a Y coordinate together so that the transparent conductive films can face each other.

Figure 8:
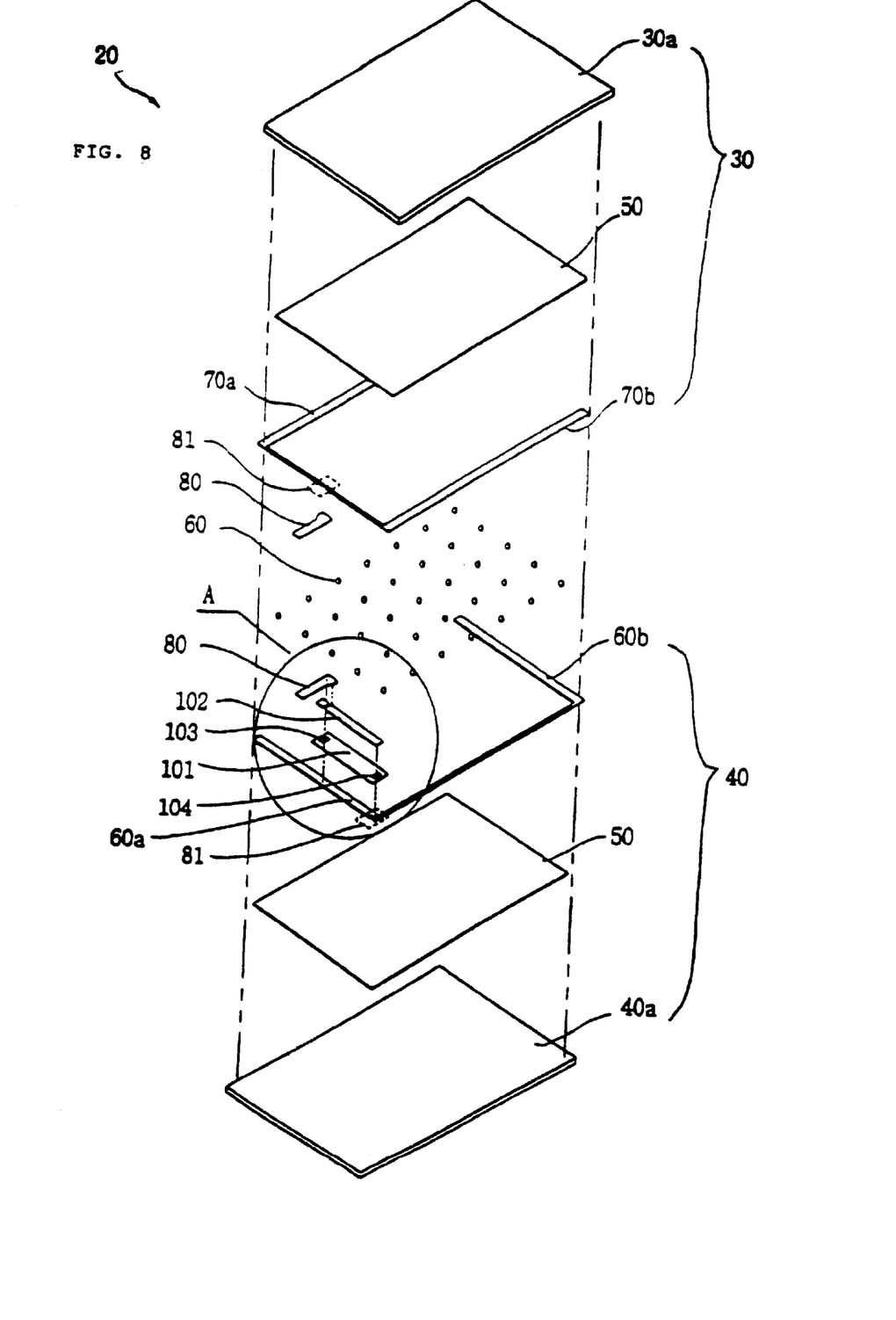
FIG. 8 is an exploded perspective view illustrating the touch panel and a method of fabricating the same according to the present invention.
Figure 9:
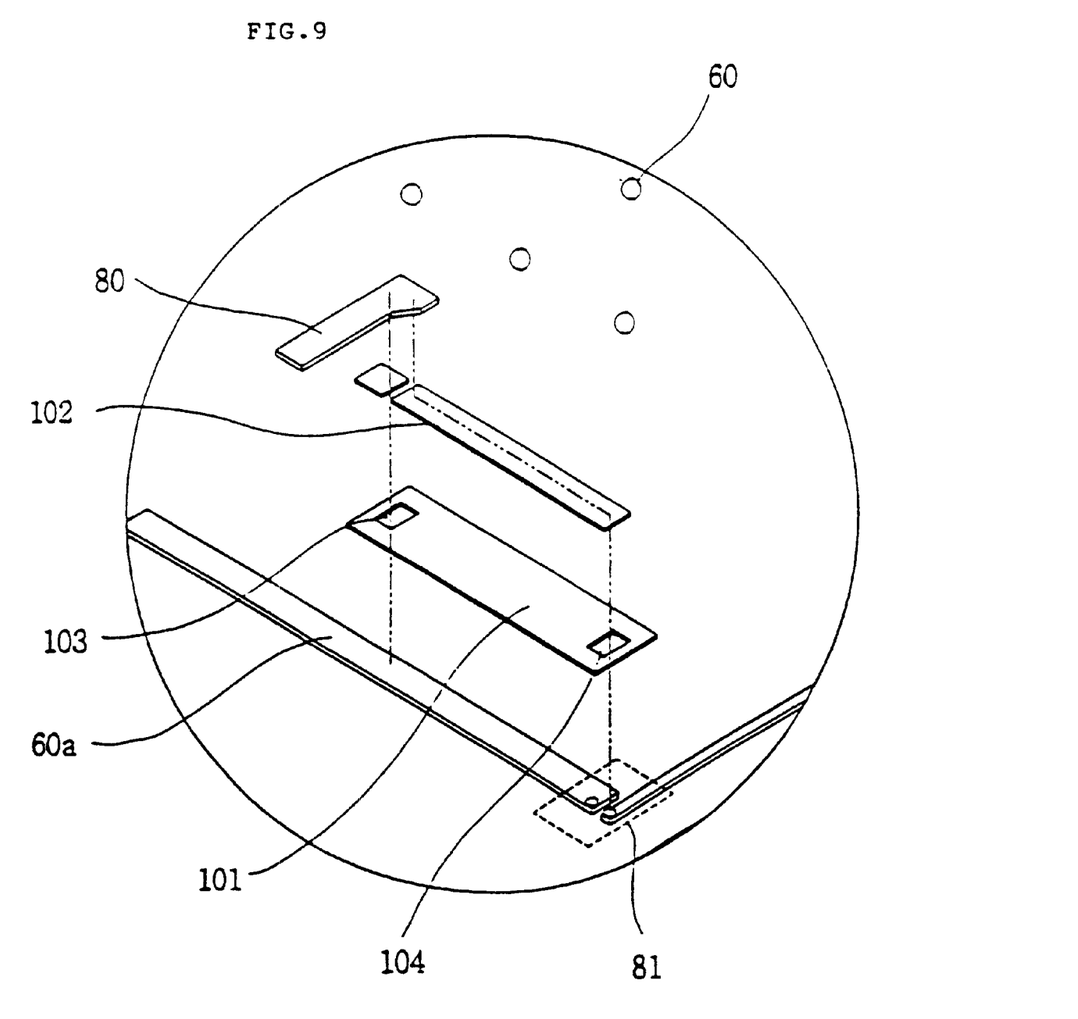
FIG. 9 is a detailed view of an A-portion of FIG. 8.
Figure 10:
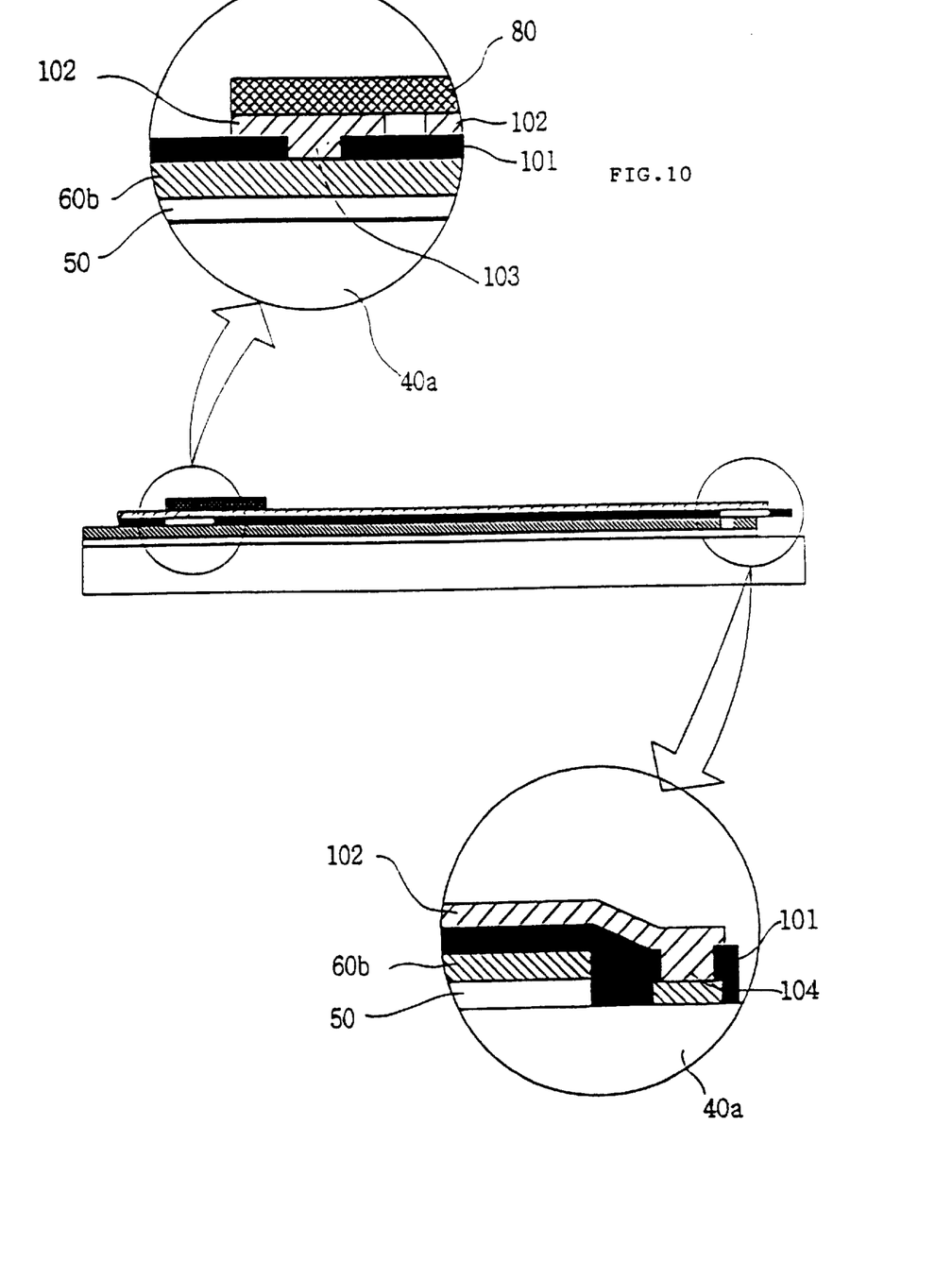
FIG. 10 is a schematic view of a touch panel contact according to the present invention.
Figure 11:
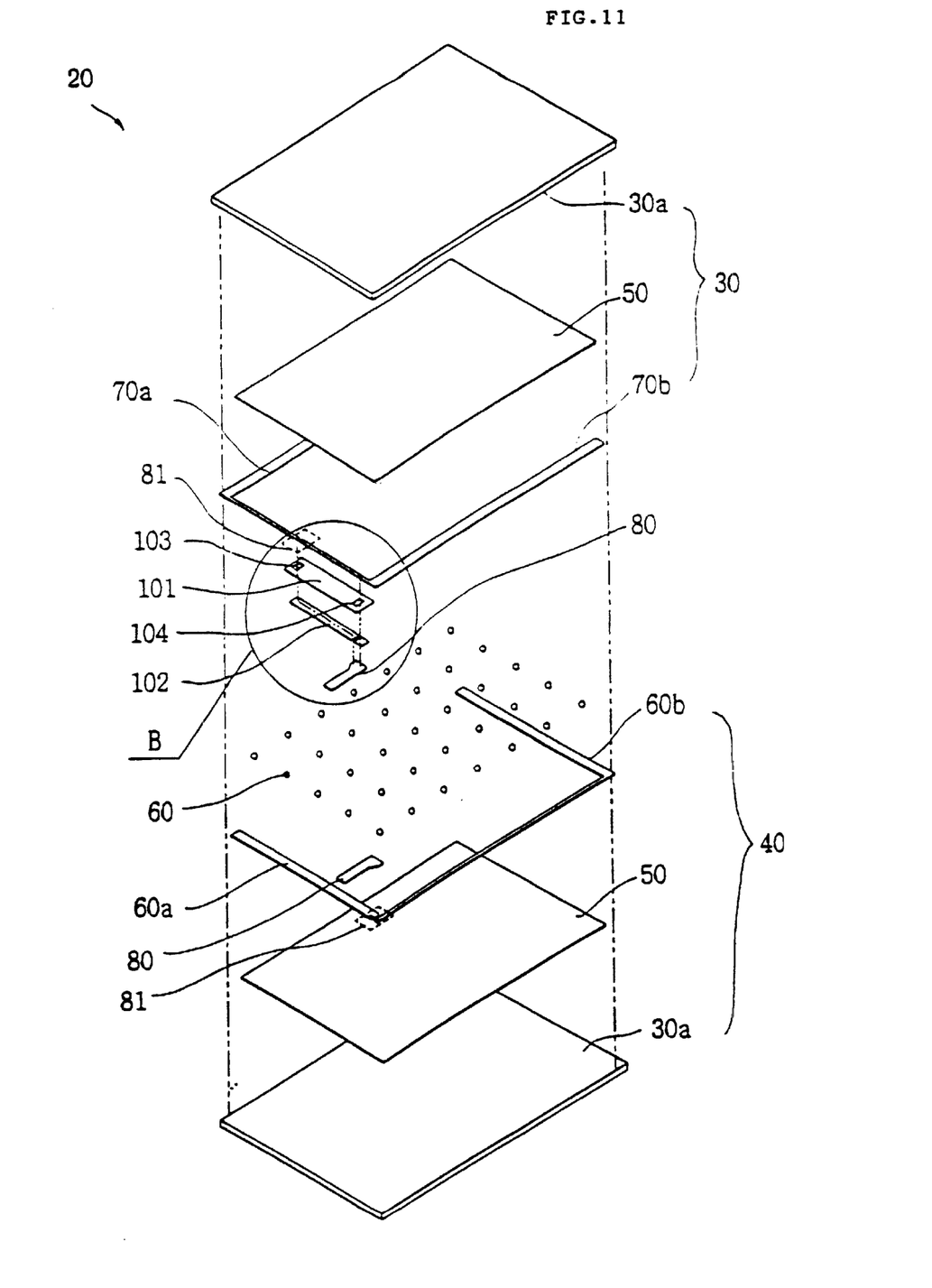
FIG. 11 is an exploded view illustrating another embodiment of the present invention.
Figure 12:
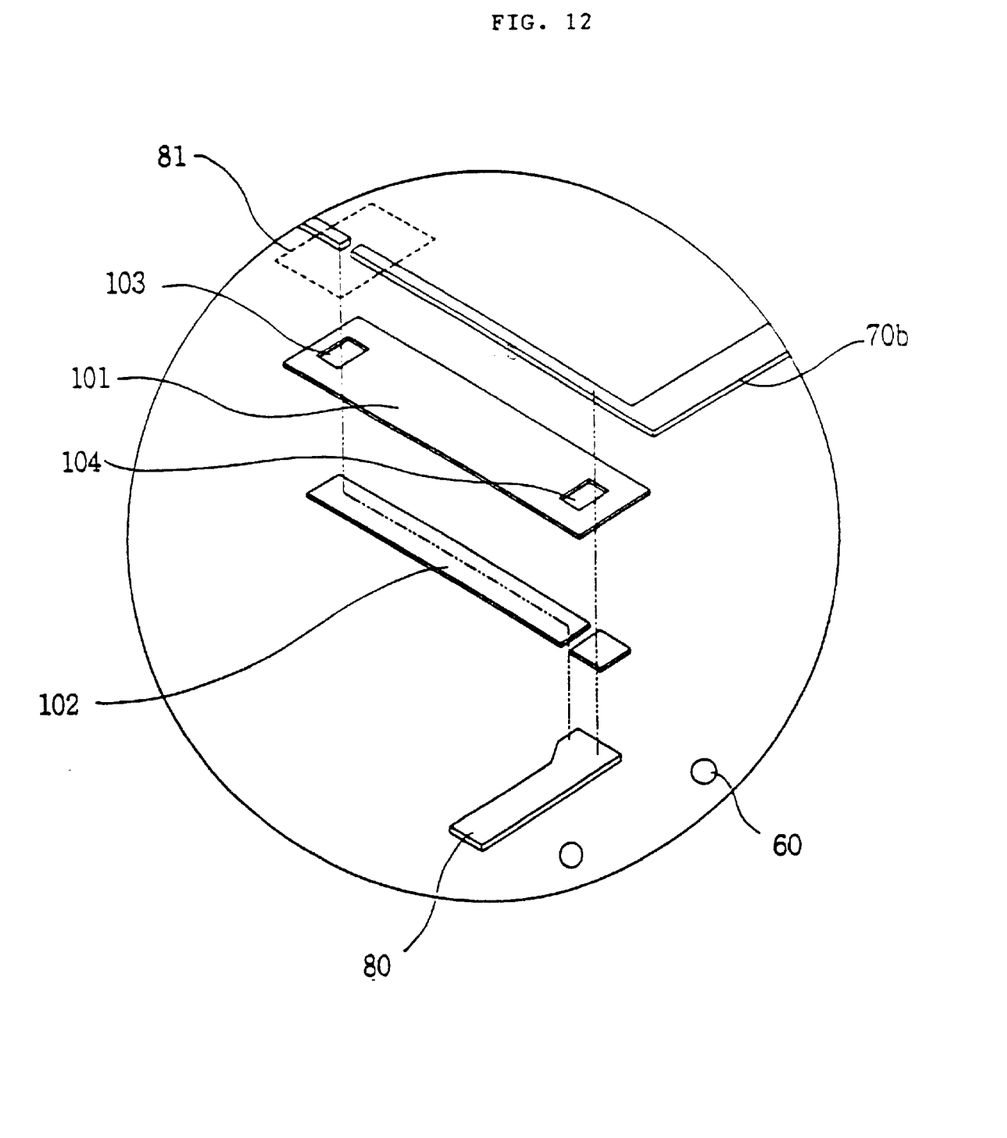
FIG. 12 is a detailed view of a B-portion of FIG. 1.
Figure 13:
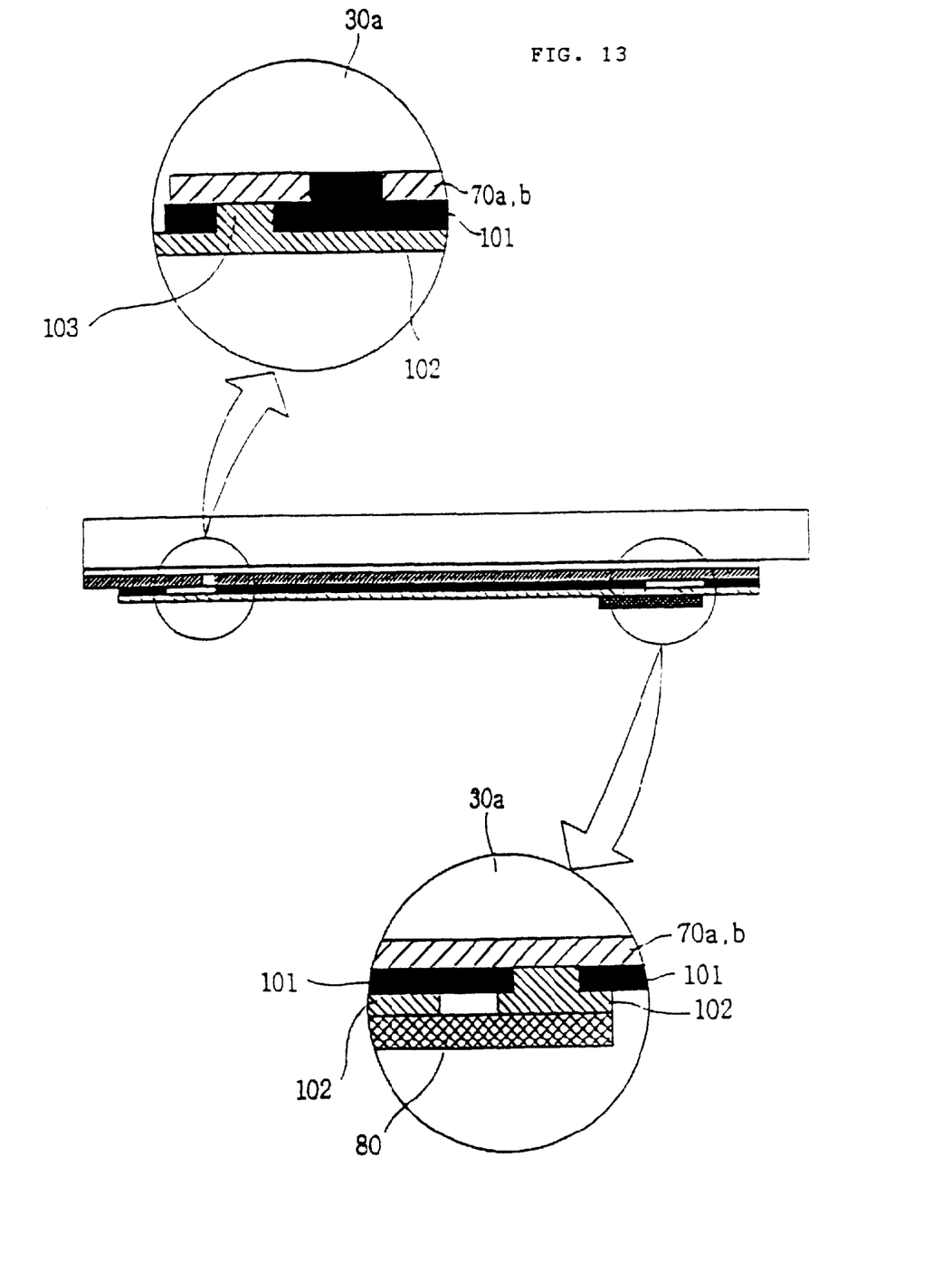
FIG. 13 is a view showing another configuration of the touch panel according to the present invention.

However, such a method of bonding the substrates has been employed when the positions of the FPC contacts have been selected at predetermined positions, and it is difficult to apply itself to a case where the positions of the FPC contacts are changeable. This method is not novel and is a mere diversion of the conventional method for bonding the touch panel. As shown in FIG. 8, the contact is positioned at a central portion of one edge of the first substrate 30, while the contact is positioned at one corner portion of the second substrate 40. In such a case, it is difficult to apply the conventional bonding method thereto as it is.

The method for bonding the substrates of the touch panel according to the present invention comprises the steps of forming the potential compensating electrodes 70a, 70b, 60a, 60b out of low resistive metal on the transparent conductive films 50 upon completion of a process of depositing insulator layers onto the first and second substrates 30, 40, and forming an arbitrary insulator layer 101 around a FPC contact 81 formed on the potential compensating electrodes of an arbitrarily selected one of the first and second substrates 30, 40 so as to arbitrarily change positions of the FPC contacts with respect to the potential compensating electrodes; forming a new low resistive metal layer 102, to which flexible printed cables 80 (FPCs) will be attached, on the insulator layer 101 so as to connect the FPCs 80 to the potential compensating electrodes of the substrates through the FPC contacts 81; forming the dot spacers 60 out of insulating material within the active area so as to achieve electric insulation between the first and second substrates 30, 40 between which the insulator layer 101 and the low resistive metal layer 102 are formed through the above steps; connecting the FPCs 80 with the band region formed by the insulator layer 101 and the low resistive metal layer 102, in order to apply signals to the first and second substrates from the outside after the insulator layer 101, when the low resistive metal layer 102 and the dot spacers 60 have been formed between the first and second substrates through the above steps; and bonding the first substrate 30 for reading an X coordinate and the second substrate 40 for reading a Y coordinate together so that the transparent conductive films 50 can face each other, after the connection between the insulator layer 101, the low resistive metal layer 102, the dot spacers 60 and the FPCs 80, which are sequentially formed through the steps, has been completed.

The method for bonding the substrates of the touch panel according to the present invention can be usefully employed in the outermost arrangement of the potential compensating electrodes 70a, 70b, 60a, 60b disposed onto the substrates, because it is suitable for the arrangement structure of the potential compensating electrodes, in which the FPCs 80 can be connected to the substrates without protruding wiring patterns for contacting with the FPCs 80 while disposing the potential compensating electrodes of the substrates at an outermost periphery thereof (refer to FIGS. 4 and 5). Furthermore, it can be likewise employed in the structure of the potential compensating electrodes in the form of the protruding wiring patterns for contacting with the FPCs. However, since the insulator layer and the low resistive metal layer should be fabricated so that they can be matched to the protruding wiring patterns one by one, it will need more complicated bond process than the aforementioned method (refer to FIGS. 1 to 3).

The present invention has an advantage in that the FPC contacts can be shifted and moved to desired positions regardless of the structure of the touch panel. Particularly, it can be usefully employed when the positions of the FPC contacts are to be changed to desired positions (on the substrate where the positions of the potential compensating electrodes and the FPC contacts have been already determined) in a state where a process of manufacturing a lot of substrates has been already considerably performed.

As an example of the present invention, the bonding method of the present invention, which comprises the steps of forming the arbitrary insulator layer around the FPC contact 81 formed on the potential compensating electrodes of the substrates and then forming the new low resistive metal layer, to which the FPCs will be attached, on the insulator layer so as to connect the FPCs to the potential compensating electrodes of the substrates, forming dot spacers, connecting the FPCs, and bonding the first and second substrates together so that the transparent conductive films can face each other, is described in order of employing the steps, as shown in FIGS. 8 to 11. However, the low resistive metal layer may be first formed, and the insulator layer may be formed later. The order of forming the layers is not a modification of the original layer structure, and it is determined according to which one of the first and second substrates is selected as an insulator layer.

In connection with the employment of the aforementioned bonding method, the structure of the substrate contact of the touch panel according to an embodiment of the present invention can be embodied in the following manner.

According to a first embodiment of the present invention, the X-axis potential compensating electrodes 70a, 70b are arranged along outermost portions of the transparent conductive film 50 on substrate layer 30a of the first substrate 30, an arbitrary point is selected from the positions on the X-axis potential compensating electrodes 70a, 70b arranged on the transparent conductive film 50 of the first substrate 30 in order to construct the FPC contact 81 of the first substrate 30 on the selected point, and the FPC 80 is then connected directly to the FPC contact 81; and the Y-axis potential compensating electrodes 60a, 60b are arranged along outermost portions of the transparent conductive film 50 on the substrate layer 40a of the second substrate 40, an arbitrary point is selected from the positions on the Y-axis potential compensating electrodes 60a, 60b arranged on the transparent conductive film 50 of the second substrate 40 in order to construct the FPC contact 81 of the second substrate 40 on the selected point, and the FPC 80 is connected directly to the FPC contact 81.

According to a second embodiment of the present invention, the X-axis (Y-axis) potential compensating electrodes 70a, 70b are arranged along outermost portions of the transparent conductive film 50 of the first substrate 30, an arbitrary point is selected from the electrode arrangement defined by the X-axis Y-axis) potential compensating electrodes 70a, 70b arranged on the transparent conductive film 50 of the first substrate 30, and the FPC contact 81 of the first substrate 30 is constructed on the selected point; the Y-axis (X-axis) potential compensating electrodes 60a, 60b are arranged along outermost portions of the transparent conductive film 50 of the second substrate 40, an arbitrary point is selected from the electrode arrangement defined by the Y-axis (X-axis) potential compensating electrodes 60a, 60b arranged on the transparent conductive film 50 of the second substrate 40, and the FPC contact 81 of the second substrate 40 is constructed on the selected point; and the insulator layer 101 is formed along the potential compensating electrodes by an arbitrary length around the FPC contacts 81 which are formed on the X-axis and Y-axis potential compensating electrodes 70a, 70b, 60a and 60b of the first and second substrates 30, 40, respectively, and the low resistive metal layer 102 to which the FPC 80 is attached is formed onto an upper layer portion of the insulator layer on the potential compensating electrodes.

According to a third embodiment of the present invention, the resistive touch panel is constructed to comprise the second substrate 40 with which the first substrate 30 is bonded together after the transparent conductive film 50 for defining the active area has been constructed by symmetrically providing the X-axis (Y-axis) potential compensating electrodes 70a, 70b (60a, 60b) made of low resistive metal at an arbitrary interval between the electrodes; the first substrate 30 with which the second substrate 40 is bonded together after the transparent conductive film 50 for defining the active area has been constructed by symmetrically providing the Y-axis (X-axis) potential compensating electrodes made of low resistive metal at an arbitrary interval between the electrodes; the dot spacers 60 filled between the first and second substrates for ensure electric insulation between the two substrates; and the contacts concentrated on the FPCs in order to create an electrical signal path with conductive material when the two first and second substrates are bonded together. Also, the insulator layer 101 is formed on the resistive touch panel along the potential compensating electrodes by an arbitrary length around the FPC contacts 81 which are formed on the X-axis and Y-axis potential compensating electrodes of the first and second substrates, respectively; and the low resistive metal layer 102 to which the FPC 80 is attached is then formed onto an upper layer portion of the insulator layer on the potential compensating electrodes.

All the contact structure of the touch panel can be manufactured by the aforementioned methods for bonding the substrates, which will be now explained as follows.

According to the first embodiment, the FPC contacts 81 are disposed near central portions of the substrates on condition of expansion of the active area through an outermost arrangement of the potential compensating electrodes 70a, 70b, 60a, 60b on the substrates. Such a kind of contacts can be obtained by applying some of the substrate bonding methods according to the present invention and regarded as a case where the positions of the FPC contacts 81 have been beforehand set near the central portions. The insulator layer 101 and the low resistive metal layer 102 are shown in the figures, as components of the touch panel. However, in a case where the positions of the FPC contacts 81 are beforehand set near the central portions, the insulator layer 101 and the low resistive metal layer 102 are not required. Therefore, the constitution of the first embodiment can happen in a case where the positions of the FPC contacts 81 are beforehand set near the central portions in connection with the outermost arrangement of the potential compensating electrodes, and do include the insulator layer 101 and the low resistive metal layer 102 (the description on the foregoing is not shown in the figures).

This constitution does not have a specific advantage in arranging the FPC contacts 81 near the central portions.

However, since connection through the connector of the external system and signal lines is needed when the external signals are applied through the FPC 80, it can be selected if a position near the central portions is regarded as a position advantageous to determination of a wiring position of driving circuit. Further, from the structural viewpoint, the optimal design such as expansion of the active area, reduction of the compensating electrode region and compactness of the products can be realized.

The constitution of the second embodiment can be obtained when all the substrate bonding method are employed while the FPC contacts 81 are positioned at an arbitrary place (near the central portions) on condition of expansion of the active area through the outermost arrangement of the potential compensating electrodes on the substrates. It can happen when the FPC contacts 81 are shifted near the central portions after the positions thereof have been initially set near the corner portions. Therefore, it comprises the insulator layer 101 having an arbitrary length (length from the corner portion to the neighborhood of the central portions or the neighborhood of the opposite corner portion) and the low resistive metal layer 102 conforming to the insulator layer (refer to FIGS. 8 to 11). According to this constitution, in order to create the electrical signal path between the potential compensating electrodes and the low resistive metal layer 102 with which the FPC 80 is substantially contacted, through-holes 103, 104 are formed during the process of forming the insulator layer 101, and the low resistive metal layer 102 to which the FPC 80 is attached is then formed, so that the metal layer can be connected to the potential compensating electrodes via the through-holes 103, 104.

Therefore, this constitution can happen when the FPC contact 81 is shifted from a corner portion toward the central portion or to the neighborhood of the opposite corner portion since the FPC contact 81 is biased toward a corner portion while the potential compensating electrodes are arranged at an outermost periphery on condition of expansion of the active area. It can be usefully employed when substrate design for the FPC contact patterns and the like, is to be changed after the design has been completed. The operation, effect, structural characteristics and the like obtained from the second embodiment are similar to those of the constitution of the first embodiment.

The constitution of the third embodiment can be employed to the touch panel of FIG. 3 in which the outermost arrangement of the potential compensating electrodes on the substrates cannot be applied, i.e., wiring pattern for contacting with the FPC 80 protrudes from the neighborhood of the central portions of the substrates.

Such a kind of contacts can be obtained by applying some or all of the substrate bonding methods according to the present invention and regarded as a structure obtained when the FPC contacts 81 are shifted to the neighborhood of the central portions after the positions of the FPC contacts 81, in which the wiring pattern protrudes toward the outside, have been set near the corner portions. Therefore, the constitution of the third embodiment includes the insulator layer 101 having an arbitrary length (from the corner portions to the neighborhood of the central portions) and the low resistive metal layer 102 conforming to the insulator layer (the description on the foregoing is not shown in the figures).

However, it is an exceptional constitution since its pre-processing operation for the wiring and pattern is complicated and any advantageous effects cannot be obtained from changes of positions of the FPC contacts.

According to the method for bonding the substrates of the resistive touch panel and the contact structure manufactured by using the method of the present invention, the optimal substrate design in which the inactive area is remarkably reduced while the active area is increased can be maintained. In particular, in a case where the FPC contacts are shifted from an arbitrary position to the other position or the positions thereof are newly set, the dislocation of the contact band can be greatly reduced from the structural viewpoint and contact stability that contact deformation resulting from the shock cannot be produced can be obtained. Further, a phenomenon such as dislocation of the contact band resulting from the pattern contact cannot be produced because the FPC contact for directly contacting the FPC is provided on each of the substrates. Furthermore, since the contact is not made by the pattern contact but by direct FPC contact, changes in the contact points cannot be produced even by the shock against the contacts. Thus, durability of the contacts is improved.

In addition, since the FPC is substituted for the signal contact necessarily needed for electrical signal exchange between the electrodes of the first and second substrates, electrical signal exchange through the FPC can be made without any problems resulting from removal of the signal contacts.

Finally, the inactive area of the touch panel can be reduced while the active area thereof can be further increased. The entire size of the touch panel can be reduced as much as the active area thereof has been increased, and thus, the touching area on the touch panel can be kept to be same as before. This increase of the active area is advantageous to the design of the compact touch panel.

According to the present invention constructed as such, there is an advantage in that the optimal design for the compact touch panel can be made since the active area on the touch panel can be increased. Further, there is an advantage in that operating errors due to the dislocation of the contacts for contacting with connectors of the external system can be reduced Furthermore, there is an advantage in that reliability of the products can be improved by reducing contact deformation with respect to the external shock.

In addition, since only the FPC contacts can be modified without substitution of the entire substrate in a case where the positions thereof are changed or the FPC contacts are shifted during the process of manufacturing the touch panel, manufacture of the touch panel can be efficiently performed. Therefore, there is an advantage in that flexibility of process can be maintained.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method for bonding substrates of a touch panel fabricated by processes of forming insulator layers on first and second substrates, forming potential compensating electrodes out of low resistive metal on transparent conductive films, forming dot spacers out of insulating material within an active area so as to achieve electric insulation between the first and second substrates, connecting a flexible printed cable (FPC) to the first and second substrates so as to apply signals to the touch panel from the outside, and bonding the first substrate for detecting an X coordinate and the second substrate for detecting a Y coordinate together so that the transparent conductive films can face each other, comprising the steps of:

forming said potential compensating electrodes out of said low resistive metal on said transparent conductive films upon completion of a process of depositing an insulator layer onto said first and second substrates, and forming the insulator layer around flexible printed cable (FPC) contacts formed on said potential compensating electrodes of arbitrarily selected one of said first and second substrates so as to arbitrarily change positions of said FPC contacts with respect to said potential compensating electrodes;

forming a new low resistive metal layer, to which said FPC will be attached, on said insulator layer so as to connect said FPC to the potential compensating electrodes of said substrates;

forming dot spacers out of insulating material within said active area to achieve electric insulation between said first and second substrates between which said insulator layer and said low resistive metal layer are formed;

connecting said FPC with a band region formed by said insulator layer and said low resistive metal layer, in order to apply signals to said first and second substrates from outside after said insulator layer, said low resistive metal layer and said dot spacers have been formed between said first and second substrates; and bonding together said first substrate for reading an X coordinate and said second substrate for reading a Y coordinate so that said transparent conductive films can face each other, after the connection between said insulator layer, said low resistive metal layer, said dot spacers and said FPC, which are sequentially formed through the steps, has been completed.

2. The method for bonding the substrates of the touch panel as claimed in claim 1, wherein said step of forming said insulator layer further comprises a step of:

forming through-holes for creating an electrical signal path between said potential compensating electrodes and said low resistive metal layer contacted substantially with said FPC so said low resistive metal layer to which said FPC is attached can be connected to said potential compensating electrodes through said through-holes formed on said insulator layer.

3. A method for bonding substrates of a touch panel, comprising the steps of:

forming an insulator layer around a flexible printed cable (FPC) contact formed on electrodes of the substrates of the touch panel;

forming a low resistive metal layer, to which the FPC is attached, on the insulator layer;

forming dot spacers out of insulating material within an active area;

connecting the FPC contact with a band region formed by the insulator layer and the low resistive metal layer after the insulator layer, the low resistive metal layer and the dot spacers have been formed; and bonding together the substrates of the touch panel, for reading an X coordinate and for reading a Y coordinate after connections between the insulator layer, the low resistive metal layer, the dot spacers and the FPC.

4. The method of claim 3, wherein the step of forming the insulating layer includes the step of: forming through-holes for creating an electrical signal path between the electrodes and the low resistive metal layer.

* * * * *